United States Patent
An et al.

(10) Patent No.: US 9,171,309 B2
(45) Date of Patent: Oct. 27, 2015

(54) METHOD AND SYSTEM FOR RATING EXPERT CLASSIFIED BY KEYWORD

(75) Inventors: Mihyang An, Seoul (KR); Soyoun Park, Gyeonggi-do (KR)

(73) Assignee: NHN Corporation, Seongnam-si (KR)

( * ) Notice: Subject to any disclaimer, the term of this patent is extended or adjusted under 35 U.S.C. 154(b) by 1275 days.

(21) Appl. No.: 12/281,804

(22) PCT Filed: Jan. 31, 2007

(86) PCT No.: PCT/KR2007/000522
§ 371 (c)(1),
(2), (4) Date: Sep. 5, 2008

(87) PCT Pub. No.: WO2007/102657
PCT Pub. Date: Sep. 13, 2007

(65) Prior Publication Data
US 2009/0049042 A1  Feb. 19, 2009

(30) Foreign Application Priority Data
Mar. 6, 2006  (KR) .................. 10-2006-0020973

(51) Int. Cl.
*G06F 7/00*        (2006.01)
*G06F 17/30*       (2006.01)
*G06Q 30/02*       (2012.01)

(52) U.S. Cl.
CPC ............ *G06Q 30/02* (2013.01); *G06F 17/3053* (2013.01)

(58) Field of Classification Search
None
See application file for complete search history.

(56) References Cited

U.S. PATENT DOCUMENTS

| 6,938,068 | B1* | 8/2005 | Kraft et al. ................... 709/203 |
| 2001/0032244 | A1* | 10/2001 | Neustel ......................... 709/206 |
| 2003/0004909 | A1* | 1/2003 | Chauhan et al. ................ 706/45 |
| 2003/0144895 | A1* | 7/2003 | Aksu et al. ........................ 705/9 |
| 2004/0044542 | A1* | 3/2004 | Beniaminy et al. ............. 706/45 |
| 2006/0031221 | A1* | 2/2006 | Melman ............................ 707/7 |
| 2008/0109491 | A1* | 5/2008 | Gupta ........................ 707/104.1 |

FOREIGN PATENT DOCUMENTS

| KR | 10-2003-0004162 | 1/2003 |
| KR | 10-2003-0036500 | 5/2003 |
| KR | 10-2003-0045765 | 6/2003 |
| KR | 10-2005-0103997 | 11/2005 |

\* cited by examiner

*Primary Examiner* — Jau-Shya Meng
(74) *Attorney, Agent, or Firm* — Greer Burns & Crain Ltd.

(57) ABSTRACT

A method and system for computing an expert point value of a user for each keyword is provided, including: a first step of assigning a first knowledge-based expert rating value associated with a keyword to a user identifier of a user which enters the keyword into an expert field; a second step of assigning a second knowledge-based expert rating value associated with the keyword to the user identifier when another user stores the keyword to correspond to the user identifier; a third step of assigning a third knowledge-based expert rating value associated with the keyword to the user identifier when the user of the user identifier performs an answer activity for the keyword; and a fourth step of computing the knowledge-based expert rating value of the user identifier for the keyword based on at least one of the first, the second, and the third knowledge-based expert rating values.

19 Claims, 11 Drawing Sheets

METHOD AND SYSTEM FOR RATING EXPERT CLASSIFIED BY KEYWORD

CROSS-REFERENCE TO RELATED APPLICATION

This application is a U.S. National Phase Application of International Application PCT Application No. PCT/KR2007/000522 filed on Jan. 31, 2007, which claims the benefit of priority from Korean Patent Application No. 10-2006-0020973 filed on Mar. 6, 2006. The disclosures of International Application PCT Application No. PCT/KR2007/000522 and Korean Patent Application No. 10-2006-0020973 are incorporated herein by reference.

TECHNICAL FIELD

The present invention relates to a method and system for rating knowledge contribution by a user for user generated questions associated with each keyword.

BACKGROUND ART

A query and answer method using a network includes a method in which a user having knowledge related to a query gives an answer when a questioner selects a directory associated with the query and then enters a title and contents on a service webpage associated with the directory. However, in this case, the answerer's expertise may not be identified.

To solve the above-described problem, the conventional art utilizes a method of computing only total expert point values of a user based on the users answer activities and the like in a network and thereby identifying the user's expertise.

However, in the conventional art, although a user performs huge amounts of answer activities and thereby maintains greater expert point values, it may be impossible to identify whether the user has knowledge associated with a query of a questioner. Accordingly, in this case, although a questioner selects an answerer by considering only expert point values and receives an answer from the selected answerer, the questioner may be unsatisfied with the answer.

DISCLOSURE OF INVENTION

Technical Goals

An aspect of the present invention provides a method of rating knowledge contribution by a user for each keyword.

Another aspect of the present invention is to assign a weight value to each of data with respect to queries and answers associated with a keyword, and compute a knowledge-based expert rating value with respect to all users enrolled in a system, and thereby enable a questioner to readily identify answerers having knowledge associated with the keyword.

Another aspect of the present invention is also to recommend answerers having a greater knowledge-based expert rating value with respect to a keyword extracted from a query, and deliver the query to an answerer selected by a questioner from the recommended answerers, and thereby improve the questioner's satisfaction for the answer and also to more frequently display the answerers having the greater knowledge-based expert rating value for the questioner and thereby improve a probability that the query is delivered to the answerers, so that the answerers may save time and effort to find a query to give an answer to.

Another aspect of the present invention is also to enable a service provider to improve questioners' satisfaction and deliver more queries to answerers through the above-described method, so that more users may use a service of the service provider.

Technical Solutions

According to an aspect of the present invention, there is provided a method of computing a knowledge-based expert rating value, the method including the steps of: (a) assigning a first knowledge-based expert rating value associated with a keyword to a user identifier of a first user when the first user indicates himself/herself as an expert associated with the keyword; (b) assigning a second knowledge-based expert rating value associated with the keyword to the user identifier of the first user when a second user selects information associated with the keyword provided by the first user; (c) assigning a third knowledge-based expert rating value associated with the keyword to the user identifier of the first user when the first user answers a question associated with the keyword; and (d) determining an indication of a knowledge-based expert rating associated with the keyword for the first user based upon at least one of three values comprising the first knowledge-based expert rating value, the second knowledge-based expert rating value and the third knowledge-based expert rating value.

In an aspect of the present invention, the method may further include the steps of: (e) performing the steps (a)~(d) with respect to all user identifiers enrolled in a system; and (f) ordering at least some of all the users according to indications of the knowledge-based expert rating associated with the keyword for the users.

In an aspect of the present invention, the method may further include the step of: performing the steps (e) and (f) with respect to a plurality of keywords classified in the system.

In an aspect of the present invention, the method may further include the steps of: receiving a query from a user; extracting at least one keyword associated with the query; extracting an N number of user identifiers of other users based on the ordered indications of the knowledge-based expert rating associated with the at least one keyword wherein the N is an integer; and providing information of the N number of the user identifiers to the user.

According to another aspect of the present invention, there is provided a method of computing a knowledge-based expert rating value, the method including the steps of: analyzing factors by referring to a database for a keyword, the factors comprising 1) whether a first user indicates himself/herself as an expert associated with the keyword, 2) whether other users select information associated with the keyword provided by the first user, 3) a number of queries that the first user has received for the keyword during a first predetermined time period, 4) a number of answers of the first user selected by other users associated with the keyword during a second predetermined time period, and 5) a number of answers of the first user, which have not been selected by other users during a third predetermined time period; assigning at least one weight value to the factors; and determining an indication of a knowledge-based expert rating associated with the keyword for the first user based on the weighted factors.

According to still another aspect of the present invention, there is provided a system for computing a knowledge-based expert rating value, the system including: a first assignment component configured to assign a first knowledge-based expert rating value associated with a keyword to a user identifier of a first user when the first user indicates himself/ herself as an expert associated with the keyword; a second assignment component configured to assign a second knowledge-based expert rating value associated with the keyword to the user identifier of the first user when a second user selects information associated with the keyword provided by the first user; a third assignment component configured to assign a third knowledge-based expert rating value associated with the keyword to the user identifier of the first user when the first user answers a question associated with the keyword; and a computation component configured to determine an indication of a knowledge-based expert rating associated with the keyword for the first user based upon at least one of three values comprising the first knowledge-based expert rating value, the second knowledge-based expert rating value and the third knowledge-based expert rating value.

BEST MODE FOR CARRYING OUT THE INVENTION

Figure 1:
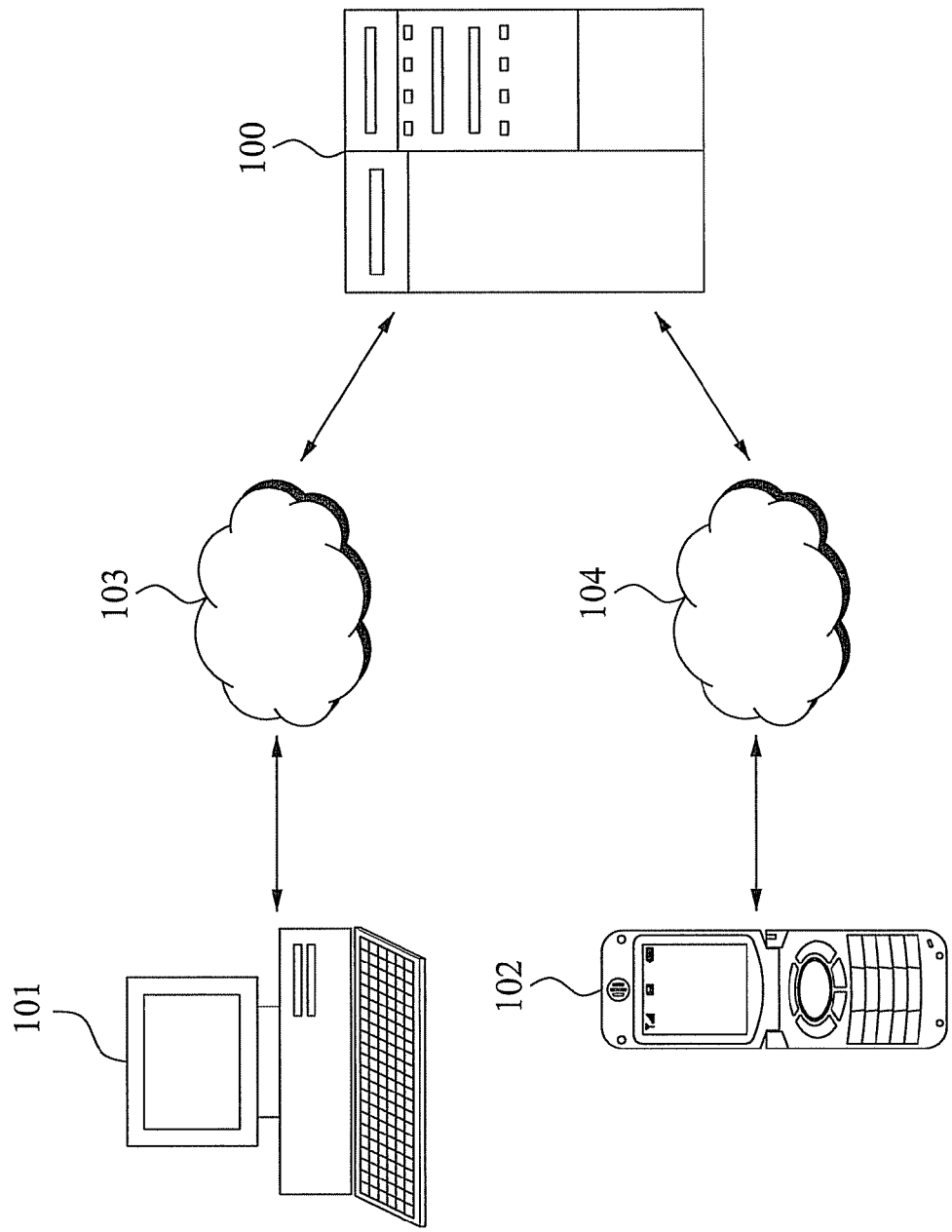
FIG. 1 illustrates a system for computing an expert point value of a user for each keyword via a network according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a system for computing an expert point value of a user for each keyword via a network according to an exemplary embodiment of the present invention.

As shown in FIG. 1, a knowledge-based expert rating value computing system 100 connects with a user terminal 101 or 102 via a wired network 103 or a wireless network 104, and transmits and receives data. The knowledge-based expert rating value computing system 100 analyzes data entered via the user terminal 101 or 102, and computes a knowledge-based expert rating value with respect to all keywords classified by the knowledge-based expert rating value computing system 100 and all users enrolled in the knowledge-based expert rating value computing system 100. Also, the knowledge-based expert rating value computing system 100 recommends a knowledge-based expert to the user using the knowledge-based expert rating value. In this instance, it will be apparent to those of ordinary skills in the art that the knowledge-based expert rating value computing system 100 may be integrated with an Internet search service system.

Figure 2:
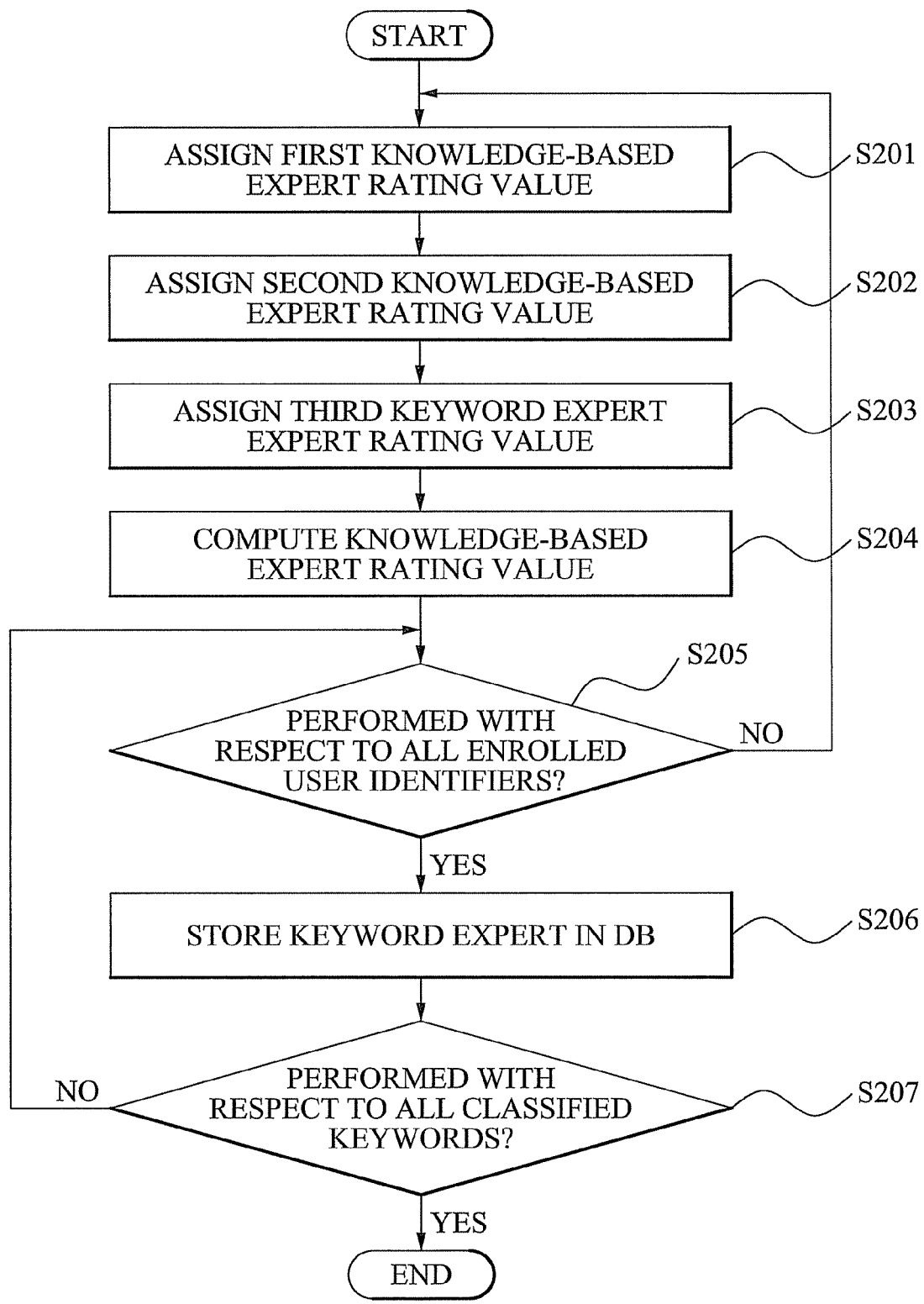
FIG. 2 is a flowchart illustrating a method of computing a knowledge-based expert rating value, with respect to all users enrolled in a system for computing the knowledge-based expert rating value, for each of keywords classified by the system according to an exemplary embodiment of the present invention.

FIG. 2 is a flowchart illustrating a method of computing a knowledge-based expert rating value, with respect to all users enrolled in a system for computing the knowledge-based expert rating value, for each of keywords classified by the system according to an exemplary embodiment of the present invention.

In operation S201, the knowledge-based expert rating value computing system 100 assigns a first knowledge-based expert rating value associated with a keyword to a user identifier of a user which enters the keyword into an expert field.

In operation S202, the knowledge-based expert rating value computing system 100 assigns a second knowledge-based expert rating value associated with the keyword to the user identifier when other user selects information associated with the keyword provided by the user identifier.

In operation S203, the knowledge-based expert rating value computing system 100 assigns a third knowledge-based expert rating value associated with the keyword to the user identifier when the user of the user identifier answers a question associated with the keyword. In this case, the knowledge-based expert rating value computing system 100 maintains information in a database. The information is associated with the answer activities of all users enrolled in the knowledge-based expert rating value computing system 100.

In operation S204, the knowledge-based expert rating value computing system 100 determines an indication of a knowledge-based expert rating associated with the keyword for the user by computing the knowledge-based expert rating value of the user identifier for the keyword based on at least one of the first knowledge-based expert rating value, the second knowledge-based expert rating value, and the third knowledge-based expert rating value. Also, operation S204 may correspond to an operation of assigning a weight value for each of the first knowledge-based expert rating value, the second knowledge-based expert rating value, and the third knowledge-based expert rating value, and thereby computing the knowledge-based expert rating value based on an add operation or a multiply operation. In this instance, the weight value is assigned according to a predetermined criterion, and the weight value is changed when necessary.

In operation S205, the knowledge-based expert rating value computing system 100 performs operations S201 through S204 with respect to all user identifiers enrolled in the knowledge-based expert rating value computing system 100. In this instance, when operations S201 through S204 are performed with respect to all enrolled user identifiers, operation S206 is performed, otherwise, operation S201 is performed.

In operation S206, the knowledge-based expert rating value computing system 100 sorts a knowledge-based expert associated with the keyword according to the knowledge-based expert rating value, and stores the sorted knowledge-based expert in a database for each keyword.

In operation S207, the knowledge-based expert rating value computing system 100 performs operations S205 and S206 with respect to all keywords classified in the knowledge-based expert rating value computing system 100. In this instance, when operations S205 and S206 are not performed with respect to all classified keywords, operation S205 is performed, otherwise, the knowledge-based expert rating value computing system 100 is terminated.

As described above, according to the present invention, it is possible to assign a weight value to each of data with respect to queries and answers associated with a keyword and compute a knowledge-based expert rating value with respect to all users of a system, and thereby enable a questioner, which desires to deliver a query, to readily identify answers having knowledge associated with the keyword.

Also, according to the present invention, it is possible to compute a knowledge-based expert rating value with respect to all user identifiers for each keyword and store the computed knowledge-based expert rating value in a database and thereby create a list of knowledge-based experts for each keyword.

Figure 3:
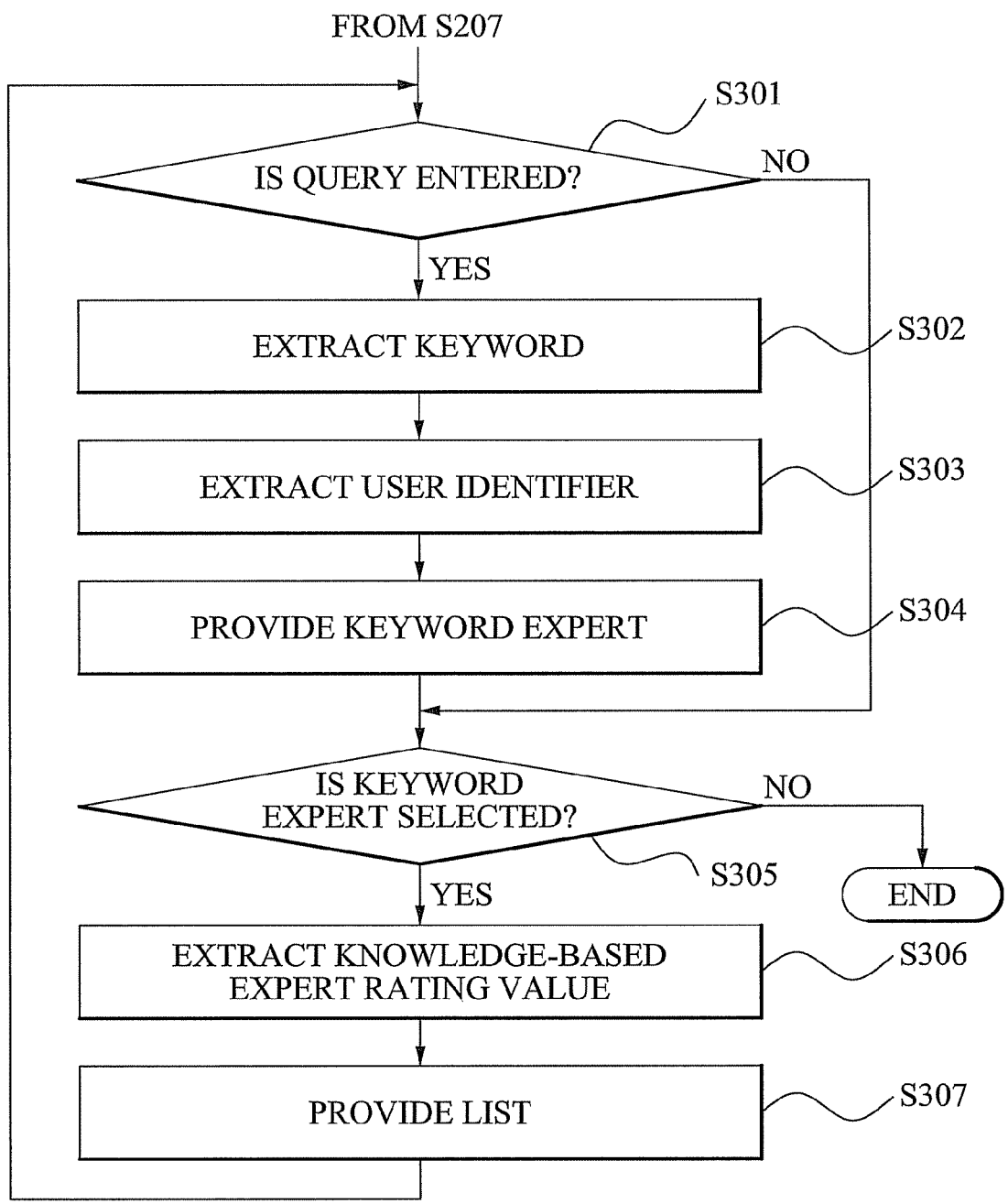
FIG. 3 is a flowchart illustrating a method of recommending a user associated with a query, entered by another user, based on a knowledge-based expert rating value according to an exemplary embodiment of the present invention.

FIG. 3 is a flowchart illustrating a method of recommending a user associated with a query entered by another user based on a knowledge-based expert rating value according to an exemplary embodiment of the present invention. In this instance, as shown in FIG. 3, operations S301 and S307 may be additionally performed after operation S207.

In operation S301, the knowledge-based expert rating value computing system 100 determines whether a query is entered via the user terminal 101 or 102. When the query is entered, operation S302 is performed, otherwise, S305 is performed.

In operation S302, the knowledge-based expert rating value computing system 100 extracts a keyword associated with the query.

In operation S303, the knowledge-based expert rating value computing system 100 extracts an N number of user identifiers of knowledge-based experts associated with the keyword by referring to the database.

In operation S304, the knowledge-based expert rating value computing system 100 displays a list of the user identifiers on the user terminal 101 or 102 and thereby recommends the knowledge-based expert to the user.

In operation S305, the knowledge-based expert rating value computing system 100 determines whether the knowledge-based expert is selected by the user. When the knowledge-based expert is selected, operation S306 is performed. Otherwise, the knowledge-based expert rating value computing system 100 is terminated. In this instance, even when a user identifier displayed on a service webpage is selected, operation S306 may be performed.

In operation S306, the knowledge-based expert rating value computing system 100 extracts the knowledge-based expert rating value associated with the knowledge-based expert, by referring to the database.

In operation S307, the knowledge-based expert rating value computing system 100 sorts and lists the knowledge-based expert rating value for each keyword, and then transmits a list of the knowledge-based expert rating value to the user terminal 101 or 102.

As described above, according to the present invention, the knowledge-based expert rating value computing system 100 recommends knowledge-based experts having a greater knowledge-based expert rating value with respect to a keyword extracted from a query, and delivers the query to a knowledge-based expert selected by a questioner. Accordingly, it is possible to improve the questioner's satisfaction for an answer. Also, since the knowledge-based experts having the greater knowledge-based expert rating value are frequently displayed for the questioner, a probability that the query is delivered to the knowledge-based expert may be increased. Accordingly, the knowledge-based experts may save time and effort to find a query to give an answer to.

Also, according to the present invention, it is possible to enable a service provider to improve questioners' satisfaction and deliver more queries to answerers through the above-described method, so that more users may use a service of the service provider.

Figure 4:
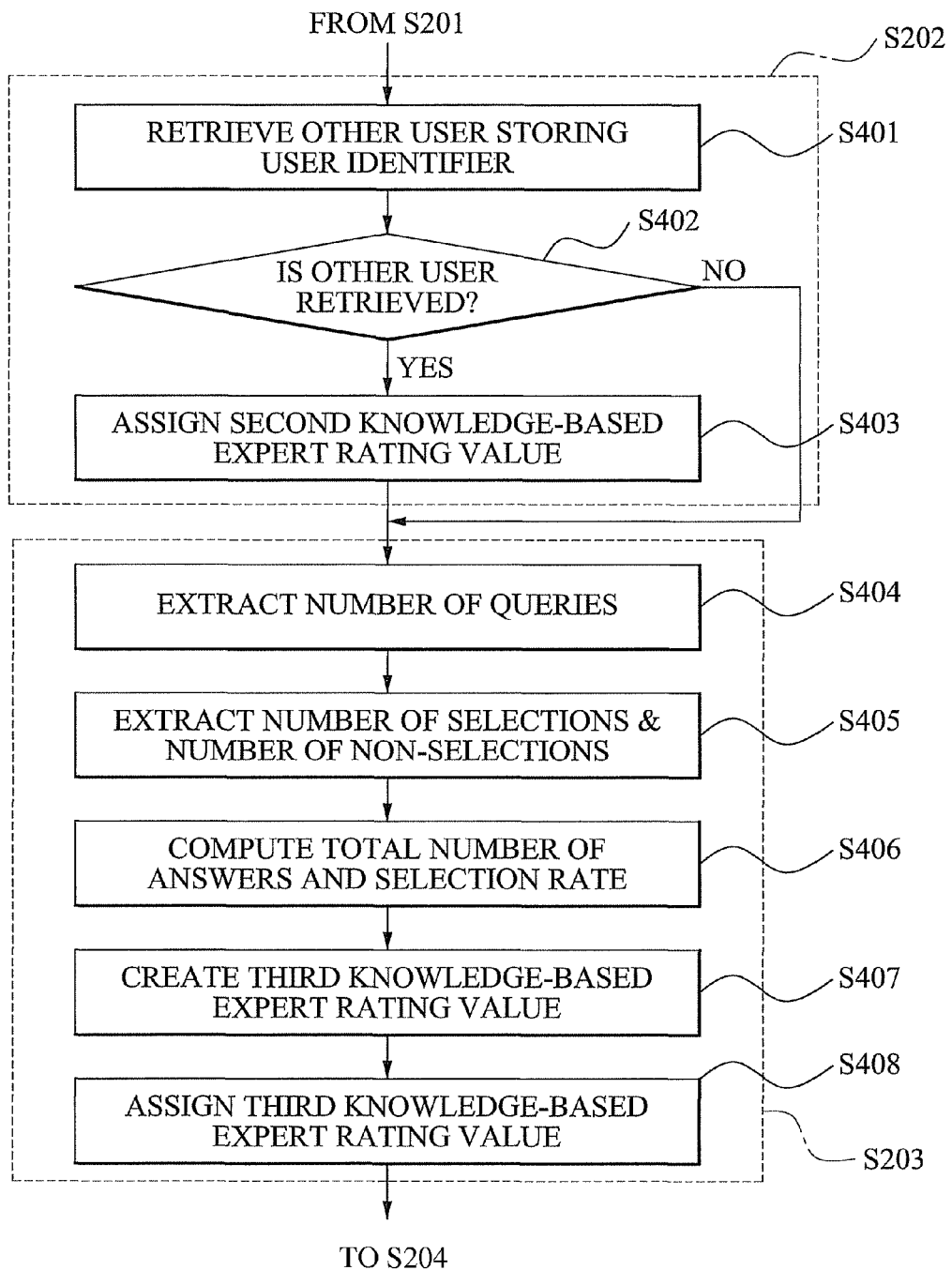
FIG. 4 is a flowchart illustrating a method of computing a knowledge-based expert rating value of a user which enters a keyword into an expert field according to an exemplary embodiment of the present invention.

FIG. 4 is a flowchart illustrating a method of computing a knowledge-based expert rating value of a user which enters a keyword into an expert field according to an exemplary embodiment of the present invention. As shown in FIG. 4, operations S401 through S403 may be included in operation S202 and thereby performed. Also, operations S404 through S408 may be included in operation S203 and thereby performed.

The knowledge-based expert rating value computing system 100 retrieves the other user storing the user identifier assigned with the first knowledge-based expert in operation S401, and determines whether the keyword is stored in a keyword storage area of the other user in operation S402. In this instance, the keyword storage area may correspond to a storage area in which the user enters the keyword for a user identifier of the other user that the user determines as an expert associated with the keyword.

When the keyword is determined to be stored in the keyword storage area in operation S402, operation S403 is performed, otherwise, operation S404 is performed.

In operation S403, the knowledge-based expert rating value computing system 100 assigns the second knowledge-based expert rating value associated with the keyword to the user identifier. In this case, the second knowledge-based expert rating value is acquired by assigning a weight value according to either a number of times that the keyword is selected, or based on an indication of a knowledge-based expert rating associated with the other user selecting the keyword. Also, the weight value is assigned according to a predetermined criterion, and the weight value is changed when necessary.

In operation S404, the knowledge-based expert rating value computing system 100 extracts a number of queries from the database. In this instance, the queries are entered for the user identifier associated with the keyword during a predetermined time period.

In operation S405, the knowledge-based expert rating value computing system 100 extracts a number of selections and a number of non-selections of the answer, entered from the user identifier associated with the keyword, during a predetermined time period from the database.

In operation S406, the knowledge-based expert rating value computing system 100 computes a total number of answers and a selection rate based on the number of selections and the number of non-selections.

In operation S407, the knowledge-based expert rating value computing system 100 assigns a weight value to the number of queries, and to the number of selections and the number of non-selections of the answer, or to the total number of answers and the selections rate, and thereby creates the third knowledge-based expert rating value.

In operation S408, the knowledge-based expert rating value computing system 100 assigns the third knowledge-based expert rating value to the user identifier.

Figure 5:
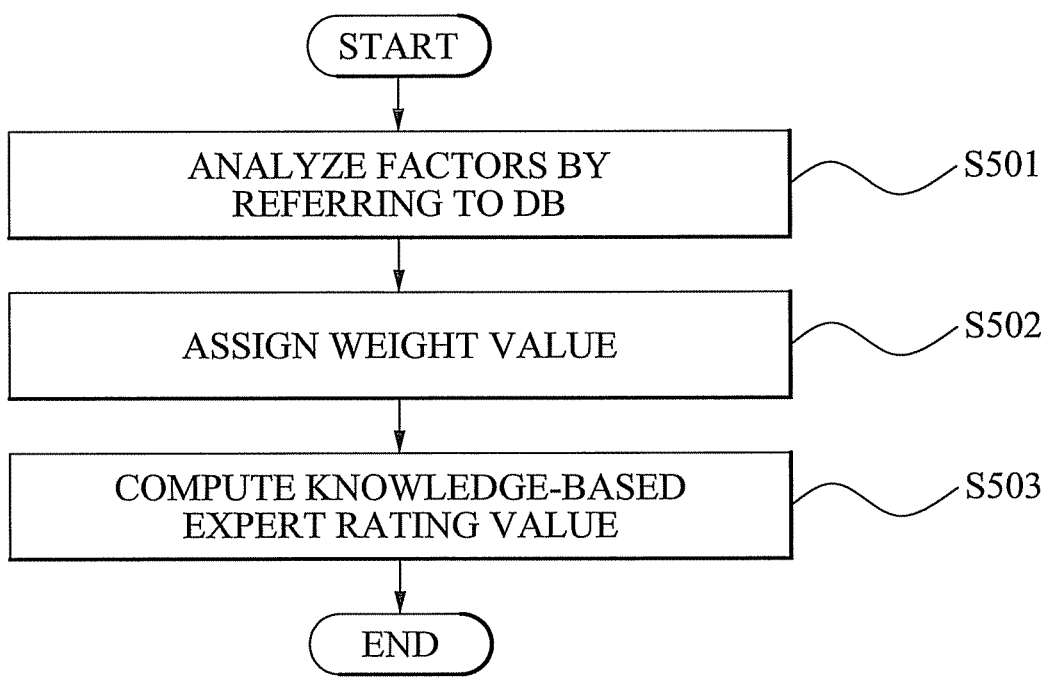
FIG. 5 is a flowchart illustrating a method of analyzing a plurality of factors and thereby computing a knowledge-based expert rating value according to an exemplary embodiment of the present invention.

FIG. 5 is a flowchart illustrating a method of analyzing a plurality of factors and thereby computing a knowledge-based expert rating value according to an exemplary embodiment of the present invention.

In operation S501, the knowledge-based expert rating value computing system 100 analyzes factors by referring to a database for a keyword. The factors include 1) whether a user enters a keyword into an expert field, 2) whether another user enters the keyword to correspond to a user identifier of the user, 3) a number of queries that the user has received for the keyword during a predetermined time period, 4) a number of selections and a number of non-selections of an answer that the user has created in association with the keyword during a predetermined time period, and 5) a factor of a total number of answers and a selection rate computed based on the number of selections and the number of non-selections.

In operation S502, when the at least one user associated with the factors 1) through 5) exists, the knowledge-based expert rating value computing system 100 assigns a weight value to a user identifier of the at least one user. In this instance, the weight value is assigned according to a predetermined criterion, and the weight value is changed when necessary.

In operation S503, the knowledge-based expert rating value computing system 100 sums up the weight value for each user and thereby computes a knowledge-based expert rating value for the keyword.

Figure 6:
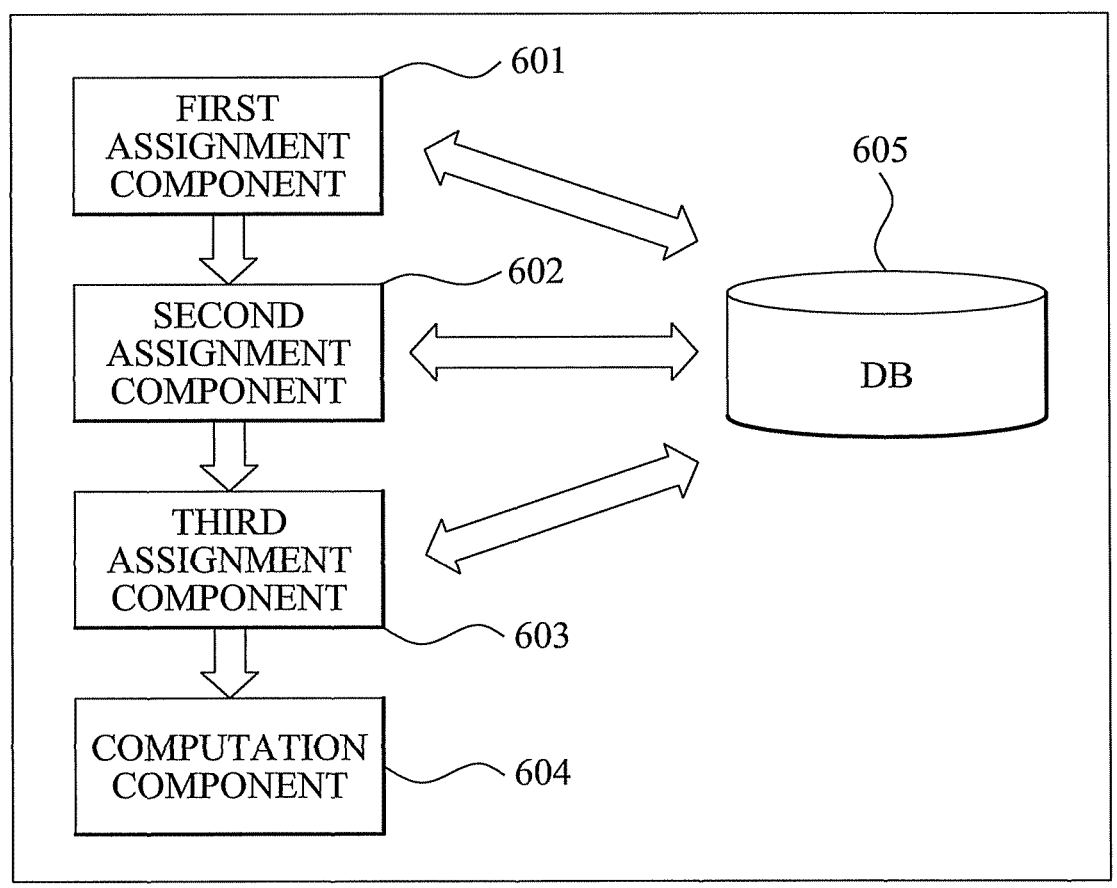
FIG. 6 is a block diagram illustrating an internal configuration of a system for computing a knowledge-based expert rating value of a user which enters a keyword into an expert field according to an exemplary embodiment of the present invention.

FIG. 6 is a block diagram illustrating an internal configuration of a system for computing a knowledge-based expert rating value of a user which enters a keyword into an expert field according to an exemplary embodiment of the present invention. In this instance, as shown in FIG. 6, the knowledge-based expert rating value computing system 100 may include a first assignment component 601, a second assignment component 602, a third assignment component 603, a computation component 604, and a database 605.

The first assignment component 601 assigns a first knowledge-based expert rating value associated with a keyword to a user identifier of a user which enters the keyword into an expert field, by referring to the database 605.

The second assignment component 602 assigns a second knowledge-based expert rating value associated with the keyword to the user identifier when another user stores the keyword to correspond to the user identifier.

The third assignment component 603 assigns a third knowledge-based expert rating value associated with the keyword to the user identifier when the user of the user identifier performs an answer activity for the keyword.

The computation component 604 computes the knowledge-based expert rating value of the user identifier for the keyword based on at least one of the first knowledge-based expert rating value, the second knowledge-based expert rating value, and the third knowledge-based expert rating value. In this instance, the computation component 604 may assign a weight value for each of the first knowledge-based expert rating value, the second knowledge-based expert rating value, and the third knowledge-based expert rating value, and thereby compute the knowledge-based expert rating value based on an add operation or a multiply operation.

The database 605 stores information about 1) whether the user enters the keyword in the expert field, 2) whether another user enters the keyword to correspond to the user identifier of the user, and 3) all answer activities in association with the first assignment 601, the second assignment 602 or the third assignment 603.

Figure 7:
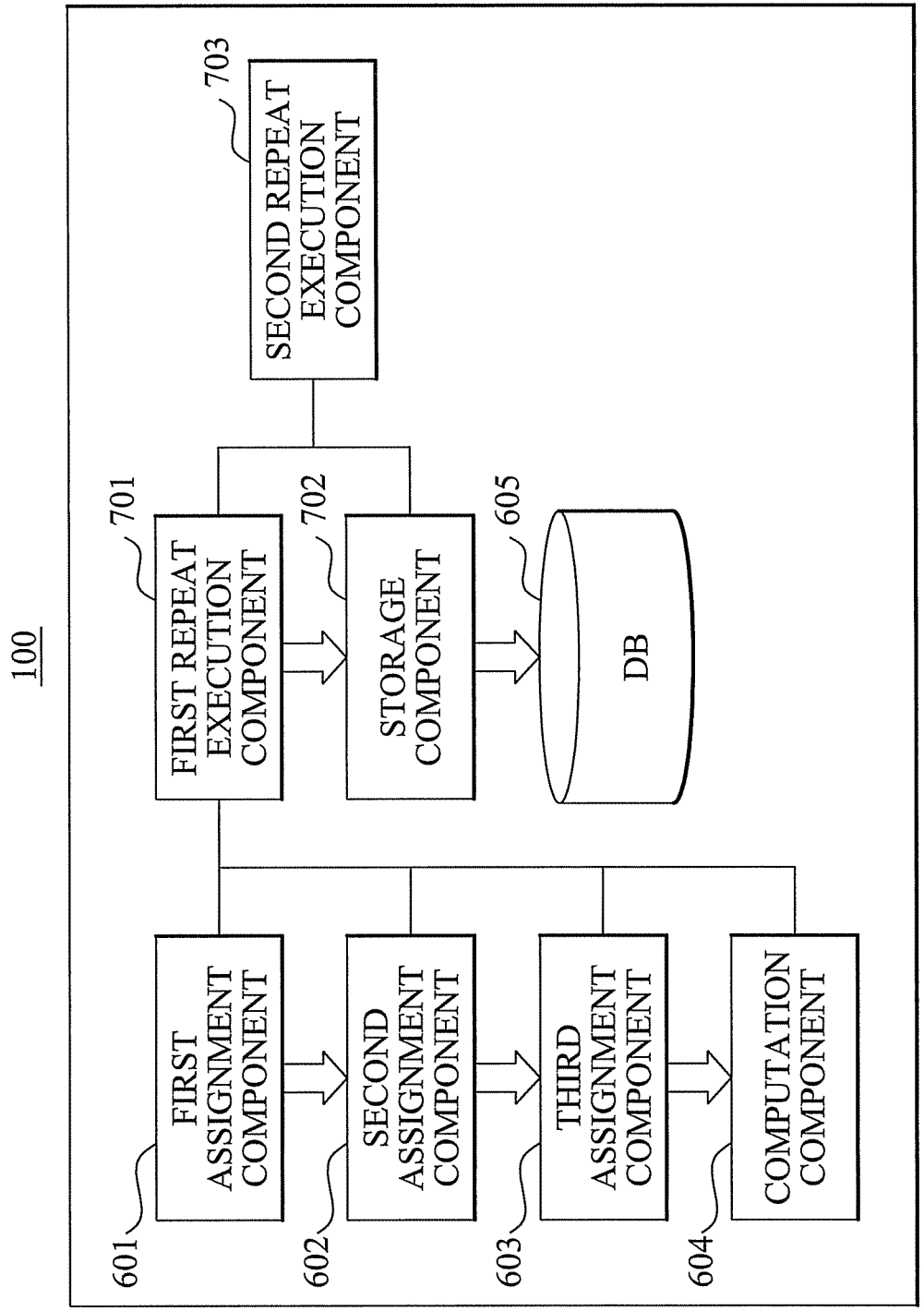
FIG. 7 is a block diagram illustrating an internal configuration of a system for computing a knowledge-based expert rating value, with respect to all enrolled users, for each of all classified keywords according to an exemplary embodiment of the present invention.

FIG. 7 is a block diagram illustrating an internal configuration of a system for computing a knowledge-based expert rating value with respect to all enrolled users for each of classified keywords according to an exemplary embodiment of the present invention.

A first repeat execution component 701 repeatedly executes the first assignment component 601, the second assignment component 602, the third assignment component 603, and the computation component 604 with respect to all user identifiers enrolled in the knowledge-based expert rating value computing system 100.

A storage component 702 sorts a knowledge-based expert associated with the keyword according to the knowledge-based expert rating value, and stores the sorted knowledge-based expert in a database for each keyword.

A second repeat execution component 703 repeatedly executes the first repeat execution component 701 and the storage unit 702 with respect to all keywords classified in the knowledge-based expert rating value computing system 100.

As described above, according to the present invention, it is possible to create a list of knowledge-based experts for a keyword by computing a keyword value for all user identifiers for each of keywords and storing the computed keyword value in a database.

Figure 8:
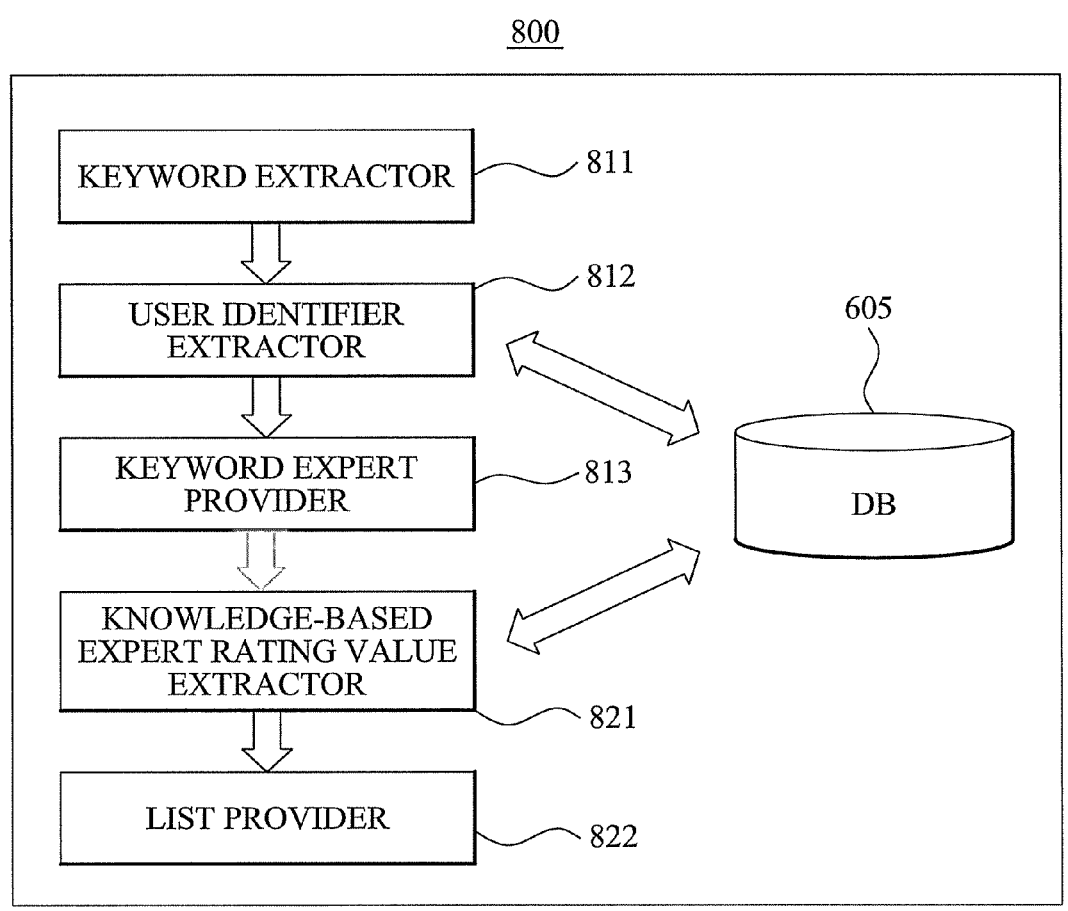
FIG. 8 is a block diagram illustrating an internal configuration of a system being added to a system for computing a knowledge-based expert rating value and recommending a knowledge-based expert for a user according to an exemplary embodiment of the present invention.

FIG. 8 is a block diagram illustrating an internal configuration of a system being added to a system for computing a knowledge-based expert rating value and recommending a knowledge-based expert to a user according to an exemplary embodiment of the present invention.

A keyword extractor 811 extracts a keyword associated with a query when the user enters the query.

A user identifier extractor 812 extracts an N number of user identifiers of knowledge-based experts associated with the keyword by referring to the database 605.

A knowledge-based expert provider 813 provides the knowledge-based expert to the user by displaying a list of the user identifiers. In this instance, the knowledge-based expert rating value corresponding to the user identifier may be added to the list of user identifiers.

A knowledge-based expert rating value extractor 821 extracts the knowledge-based expert rating value associated with the knowledge-based expert by referring to the database 605 when the user selects the knowledge-based expert.

Figure 9:
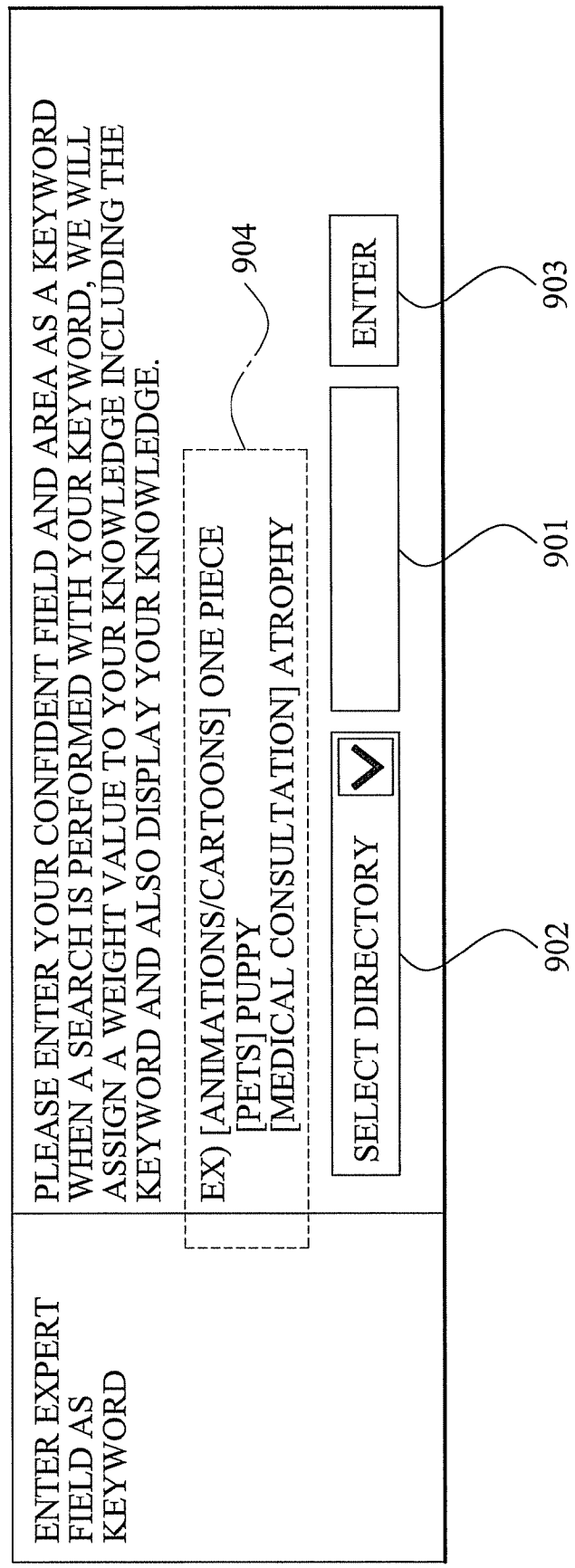
FIG. 9 illustrates an example of a method of entering a keyword into a user's expert field via a service webpage according to an exemplary embodiment of the present invention.

A list provider 822 sorts and lists the knowledge-based expert rating value for each keyword, and thereby provides a list of the knowledge-based expert rating value for the user FIG. 9 illustrates an example of a method of entering a keyword into a user's expert field via a service webpage according to an exemplary embodiment of the present invention.

A service webpage 900 is provided from the knowledge-based expert rating value computing system 100. The service webpage 900 includes a field 901 in which a user may enter the user's expert field as a keyword. In this instance, as shown in FIG. 9, a directory is selected in a directory selection field 902 and a keyword associated with the directory is entered into a keyword enter field 903. Accordingly, as shown in example 904, it is possible to match the directory and the keyword. Also, it is possible to add the first knowledge-based expert rating value associated with the keyword to the user identifier of the user which enters the keyword into the expert field and thereby utilize the first knowledge-based expert rating value when computing the knowledge-based expert rating value.

Figure 10:
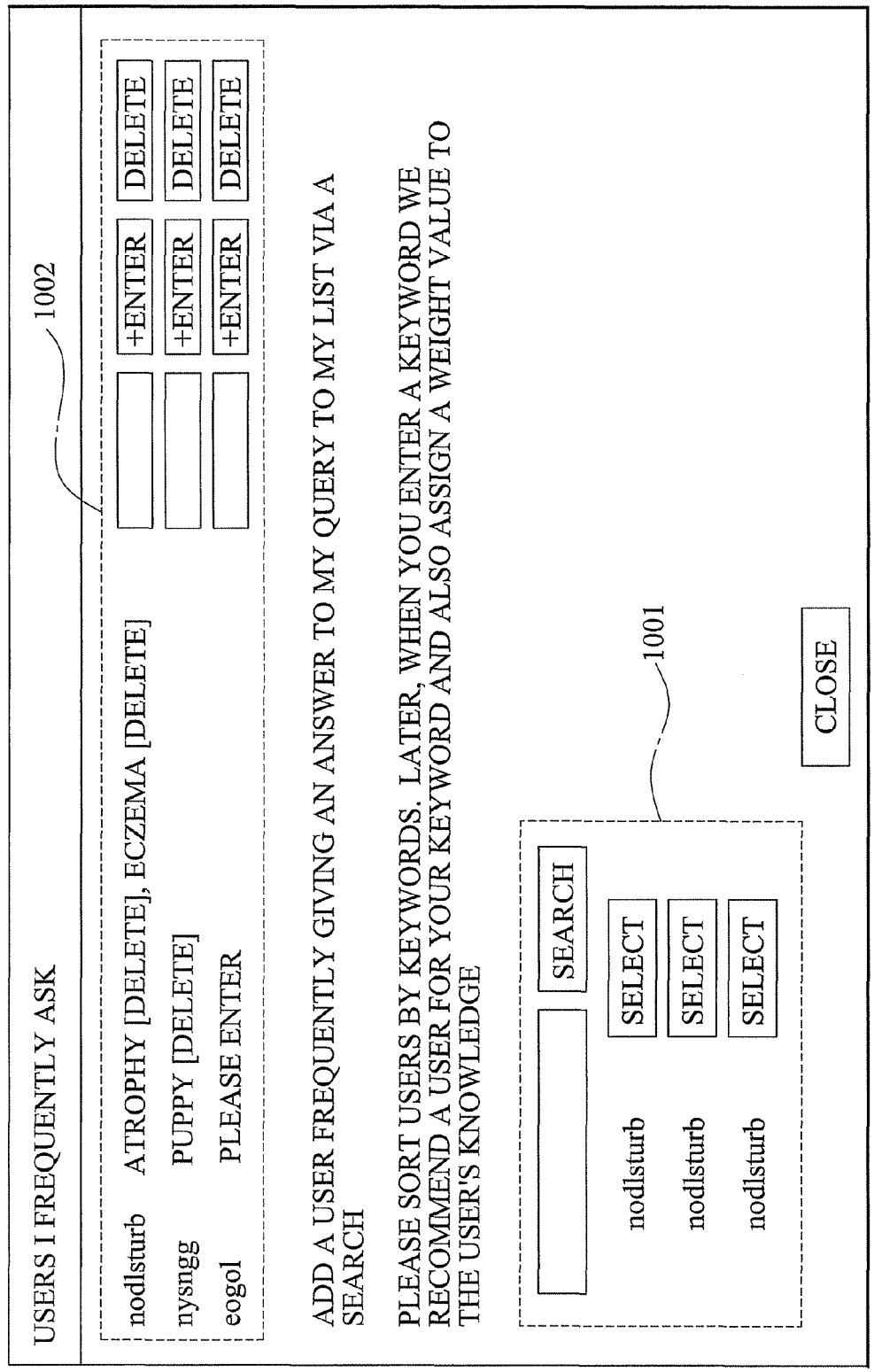
FIG. 10 illustrates an example of a method of entering a keyword corresponding to a user identifier of another user via a service webpage according to an exemplary embodiment of the present invention.

FIG. 10 illustrates an example of a method of entering a keyword corresponding to a user identifier of another user via a service webpage according to an exemplary embodiment of the present invention.

A service webpage 1000 is provided from the knowledge-based expert rating value computing system 100. In the service webpage 1000, it is possible to retrieve and select the user identifier of the other user as shown in reference numeral 1001, and enter the keyword corresponding to the selected user identifier as shown in reference numeral 1002. As described above, it is possible to add the second knowledge-based expert rating value associated with the keyword to the user identifier and thereby utilize the second knowledge-based expert rating value when computing the knowledge-based expert rating value.

Figure 11:
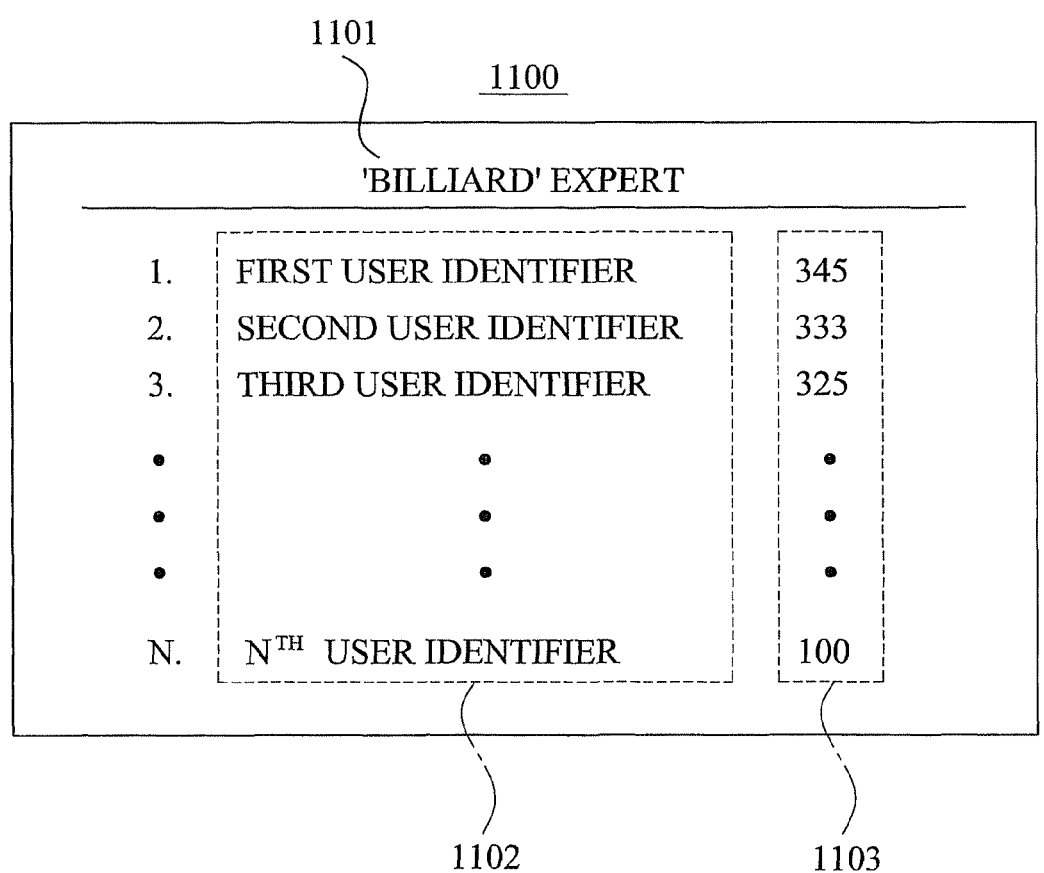
FIG. 11 illustrates an example of a method of displaying a knowledge-based expert using a keyword extracted from a user's query according to an exemplary embodiment of the present invention.

FIG. 11 illustrates an example of a method of displaying a knowledge-based expert using a keyword extracted from a user's query according to an exemplary embodiment of the present invention.

A service webpage 1100 is provided from the knowledge-based expert rating value computing system 100. In the service webpage 1100, the knowledge-based expert rating value computing system 100 extracts an N number of user identifiers 1102 associated with a keyword 1101 extracted from the user's query, and provides the extracted N number of user identifiers 1102 and knowledge-based expert rating values 1103. In this instance, the knowledge-based expert rating values 1103 may be created based on factors including 1) whether a user enters a keyword into an expert field, 2) whether another user enters the keyword to correspond to a user identifier of the user, 3) a number of queries that the user has received for the keyword during a predetermined time period, 4) a number of selections and a number of non-selections of an answer that the user has created in association with the keyword during a predetermined time period, and 5) a factor of a total number of answers and a selection rate computed based on the number of selections and the number of non-selections.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

According to the present invention, it is possible to assign a weight value to each of data with respect to queries and answers associated with a keyword, and compute a knowledge-based expert rating value with respect to all users enrolled in a system, and thereby enable a questioner to readily identify answerers having knowledge associated with the keyword.

Also, according to the present invention, it is possible to recommend answerers having a greater knowledge-based expert rating value with respect to a keyword extracted from a query, and deliver the query to an answerer selected by a questioner from the recommended answerers, and thereby improve the questioner's satisfaction for the answer. Also, it is possible to more frequently display the answerers having the greater knowledge-based expert rating value for the questioner and thereby improve a probability that the query is delivered to the answerers, so that the answerers may save time and effort to find a query to give an answer to.

Also, according to the present invention, it is possible to enable a service provider to improve questioners' satisfaction and deliver more queries to answerers through the above-described method, so that more users may use a service of the service provider.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method that uses a processor to rate a knowledge-based expert, the method comprising:

receiving, by the processor, information from a first user indicating himself/herself as an expert associated with a particular keyword by providing the particular keyword, the particular keyword representing a subordinate field of a directory related to expert knowledge of the first user, both the subordinate field and the particular keyword being determined and provided by the first user;

assigning, by the processor, a first knowledge-based expert rating value associated with the particular keyword to a user identifier of the first user in response to receiving the information from the first user;

assigning a second knowledge-based expert rating value associated with the particular keyword to the user identifier of the first user in response to a second user determining the first user to be an expert in association with the particular keyword and recording the user identifier of the first user and the particular keyword in a database for the second user;

assigning a third knowledge-based expert rating value associated with the particular keyword to the user identifier of the first user in response to the first user having previously answered at least one question associated with the particular keyword, wherein the assigning of the third knowledge-based expert rating value comprises counting a number of times that an answer of the first user associated with the particular keyword are selected by other users; and determining, using the processor, an indication of a knowledge-based expert rating associated with the particular keyword for the first user based upon the first knowledge-based expert rating value and at least one of the second knowledge-based expert rating value and the third knowledge-based expert rating value.

2. The method of claim 1, further comprising:
performing the assigning the first, second and third knowledge-based expert rating values and the determining the indication of a knowledge-based expert rating associated with the particular keyword with respect to a plurality of user identifiers enrolled in a system; and
ordering at least some of the user identifiers, according to respective indications of knowledge-based expert ratings associated with the particular keyword for the users corresponding to the user identifiers.

3. The method of claim 2, further comprising:
conducting the performing and ordering with respect to a plurality of keywords classified in the system.

4. The method of claim 3, further comprising:
receiving a query from a third user;
extracting at least one keyword associated with the query;
extracting N number of user identifiers of other users based on ordered indications of knowledge-based expert ratings associated with the at least one keyword, wherein N is an integer; and
providing information of the N number of the user identifiers to the third user.

5. The method of claim 3, further comprising:
in response to a fourth user's request for a knowledge-based expert associated with the particular keyword, providing a list of at least one knowledge-based expert associated with the particular keyword based on the indications of the knowledge-based expert ratings associated with the particular keyword for the users.

6. The method of claim 1, wherein the second knowledge-based expert rating value is determined by applying a weight value based on a number of times the particular keyword provided by the first user is selected by the second user.

7. The method of claim 1, wherein the second knowledge-based expert rating value is determined by applying a weight value based on an indication of a knowledge-based expert rating of the second user associated with the particular keyword.

8. The method of claim 1, wherein the assigning the third knowledge-based expert rating value further comprises:
determining a selection rate of the answer based on a counted number of selections of the answer and non-selection of the answer of the first user by other users.

9. The method of claim 8, wherein the third knowledge-based expert rating value is determined by assigning different weight values to the number of answers provided by the first user, the number of selections, and the selection rate.

10. The method of claim 1, wherein the determining comprises:
assigning different weight values for the second knowledge-based expert rating value and the third knowledge-based expert rating value to determine the indication of the knowledge based expert rating associated with the particular keyword for the first user.

11. The method of claim 1, further comprising:
storing the indication of the knowledge-based rating in a database in association with the first user and the particular keyword.

12. The method of claim 1, wherein the first user indicating himself/herself as an expert comprises receiving from the first user selection of the particular keyword among given keywords that is related to an expert area of the first user.

13. A method of computing a knowledge-based expert rating value, the method comprising:

analyzing, by a processor, at least two of factors by referring to a database for a particular keyword, the particular keyword representing a subordinate field of a directory related to expert knowledge of a first user, both the subordinate field and the particular keyword being determined and provided by the first user,
the factors comprising 1) the first user indicating himself/herself as an expert associated with the particular keyword by providing the particular keyword, 2) other users determining the first user as an expert in association with the particular keyword and recording the user identifier of the first user and the particular keyword in a database for the other users, 3) a number of queries that the first user has received for the particular keyword during a first time period, 4) a number of selection of an answer of the first user selected by other users associated with the particular keyword during a second time period, and 5) a number of selection of an answer of the first user associated with the particular keyword that were not selected by other users during a third time period;
assigning a weight value to factor 1) and to the at least one of the other factors 2) to 5); and
determining an indication of a knowledge-based expert rating associated with the particular keyword for the first user based on the weighted value of factor 1) and least one of the other factors 2) to 5).

14. A non-transitory computer-readable storage medium storing an executable program, executed by a processor, that causes a performance of the following steps to rate a knowledge-based expert:
receiving information from a first user indicating himself/herself as an expert associated with a particular keyword by providing the particular keyword, the particular keyword representing a subordinate field of a directory related to expert knowledge of the first user, both the subordinate field and the particular keyword being determined and provided by the first user;
assigning a first knowledge-based expert rating value associated with the particular keyword to a user identifier of the first user in response to receiving the information from the first user;
assigning a second knowledge-based expert rating value associated with the particular keyword to the user identifier of the first user in response to a second user determining the first user to be an expert in association with the particular keyword and recording the user identifier of the first user and the particular keyword in a database for the second user;
assigning a third knowledge-based expert rating value associated with the particular keyword to the user identifier of the first user in response to the first user having previously answered at least one question associated with the particular keyword, wherein the assigning of the third knowledge-based expert rating value comprises counting a number of times that an answer of the first user associated with the particular keyword are selected by other users; and
determining an indication of a knowledge-based expert rating associated with the particular keyword for the first user based upon the first knowledge-based expert rating value and at least one of the second knowledge-based expert rating value and the third knowledge-based expert rating value.

15. A system for computing a knowledge-based expert rating value, the system comprising:
one or more processors to process data;

at least one memory to store an executable program and a database, the database comprising a plurality of keywords and knowledge-based expert rating values associated with the plurality of keywords, and the program including a plurality of instruction components executed by the one or more processors, the plurality of instruction components including;

a first assignment component to receive information from a first user indicating himself/herself as an expert associated with a particular keyword among the plurality of keywords by providing the particular keyword, the particular keyword representing a subordinate field of a directory related to expert knowledge of the first user, both the subordinate field and the particular keyword being determined and provided by the first user, and to assign a first knowledge-based expert rating value associated with the particular keyword to a user identifier of the first user in response to receiving the information from the first user;

second assignment component to assign a second knowledge-based expert rating value associated with the particular keyword among the plurality of keywords to the user identifier of the first user in response to a second user determining the first user to be an expert in association with the particular keyword and recording the user identifier of the first user and the particular keyword in a database for the second user;

a third assignment component to assign a third knowledge-based expert rating value associated with the particular keyword among the plurality of keywords to the user identifier of the first user in response to the first user having previously answered at least one question associated with the particular keyword, wherein the assigning of the third knowledge-based expert rating value comprises counting a number of times that an answer of the first user associated with the particular keyword are selected by other users; and a computation component to determine an indication of a knowledge-based expert rating associated with the particular keyword among the plurality of keywords for the first user based upon the first knowledge-based expert rating value and at least one of the second knowledge-based expert rating value and the third knowledge-based expert rating value.

16. The system of claim 15, wherein the plurality of components further comprises:

a first repeat execution component to cause the first assignment component, the second assignment component, the third assignment component, and the computation component to perform assigning first, second, and third knowledge-based expert rating values, and determine indications of knowledge-based expert ratings, with respect to a plurality of user identifiers enrolled in the system; and a storage component to perform sorting information of at least one keyword expert by the particular keyword according to the at least one keyword expert's indication of knowledge-based expert rating, and store the sorted information in a database for the particular keyword.

17. The system of claim 16, wherein the plurality of components further comprises:

a second repeat execution component to cause the first repeat execution component to perform the assigning first, second, and third knowledge-based expert rating values and the determining indications of knowledge-based expert ratings and to cause the storage component to perform the sorting and storing, with respect to a plurality of keywords classified in the system.

18. The system of claim 17, wherein the plurality of components further comprises:

a keyword extractor to extract a keyword associated with a query in response to a third user entering the query;

a user identifier extractor to extract N number of user identifiers of keyword experts associated with the extracted keyword by referring to the database; and a keyword expert provider to provide the third user with a list of at least one of the user identifiers as experts associated with the extracted keyword.

19. The system of claim 17, wherein the plurality of components further comprises:

a knowledge-based expert rating value extractor to extract an indication of a knowledge-based expert rating associated with a keyword expert by referring to the database in response to a fourth user selecting the keyword expert; and a list provider to sort and list indications of the knowledge-based expert ratings for the classified keywords to provide a list of the indications of the knowledge-based expert ratings for the users.

* * * * *